(12) United States Patent
Yu et al.

(10) Patent No.: US 8,827,052 B2
(45) Date of Patent: Sep. 9, 2014

(54) DECELERATOR AND MOTOR BRAKE WITH THE SAME

(71) Applicant: Mando Corporation, Gyeonggi-do (KR)

(72) Inventors: Sung Wook Yu, Seoul (KR); Chang Bok Ko, Gyunggi-Do (KR)

(73) Assignee: Mando Corporation, Gyeonggi-Do (KR)

(*) Notice: Subject to any disclaimer, the term of this patent is extended or adjusted under 35 U.S.C. 154(b) by 128 days.

(21) Appl. No.: 13/676,749

(22) Filed: Nov. 14, 2012

(65) Prior Publication Data

US 2013/0126279 A1    May 23, 2013

(30) Foreign Application Priority Data

Nov. 17, 2011    (KR) .................. 10-2011-0119911

(51) Int. Cl.
| | | |
|---|---|---|
| *F16D 55/08* | (2006.01) | |
| *F16H 37/04* | (2006.01) | |
| *F16D 55/00* | (2006.01) | |
| *B60T 13/74* | (2006.01) | |
| *F16H 1/28* | (2006.01) | |
| *F16H 1/32* | (2006.01) | |

(52) U.S. Cl.
CPC ............ *B60T 13/746* (2013.01); *F16H 37/041* (2013.01); *F16D 55/00* (2013.01); *F16H 1/28* (2013.01); *F16H 1/32* (2013.01); *B60T 13/741* (2013.01)
USPC ...... 188/72.1; 188/72.8; 180/65.51; 475/149; 475/150; 475/162

(58) Field of Classification Search
USPC ................... 188/72.1, 72.8; 180/65.5, 65.51; 475/149, 150, 162
See application file for complete search history.

(56) References Cited

U.S. PATENT DOCUMENTS

| | | | | |
|---|---|---|---|---|
| 4,503,719 | A * | 3/1985 | Hamano | 74/7 E |
| 4,804,073 | A * | 2/1989 | Taig et al. | 188/72.1 |
| 5,307,905 | A * | 5/1994 | Hall et al. | 188/72.6 |
| 6,315,092 | B1* | 11/2001 | Schwarz | 188/265 |
| 6,367,593 | B1* | 4/2002 | Siler et al. | 188/72.1 |
| 6,761,660 | B2* | 7/2004 | Lim | 475/179 |
| 6,811,514 | B2* | 11/2004 | Bowman | 475/338 |
| 6,889,800 | B2* | 5/2005 | Halasy-Wimmer et al. | 188/72.8 |
| 7,014,017 | B2* | 3/2006 | Hanna et al. | 188/2 D |
| 7,350,605 | B2* | 4/2008 | Mizutani et al. | 180/65.51 |
| 7,350,606 | B2* | 4/2008 | Brill et al. | 180/65.51 |

(Continued)

FOREIGN PATENT DOCUMENTS

| | | |
|---|---|---|
| JP | 2010038307 | 2/2010 |
| KR | 1020100097564 | 9/2010 |
| KR | 101041553 | 6/2011 |

*Primary Examiner* — Robert A Siconolfi
*Assistant Examiner* — James Hsiao
(74) *Attorney, Agent, or Firm* — Ohlandt Greeley Ruggiero & Perle L.L.P.

(57) ABSTRACT

Disclosed herein are a decelerator in which a first deceleration unit of a planet gear type is provided inside a second deceleration unit of a cycloid type so as to apply eccentric rotation force to the second deceleration unit, and a motor brake with the same. The decelerator restricts an increase in the axial thickness of a motor and achieves an effectively increased deceleration ratio, and the motor brake equipped with the decelerator restricts an increase of the overall length thereof due to the decelerator, achieving enhanced space utility.

5 Claims, 4 Drawing Sheets

(56) References Cited

U.S. PATENT DOCUMENTS

| | | | |
|---|---|---|---|
| 7,445,067 B2 * | 11/2008 | Marsh et al. | 180/65.51 |
| 7,753,151 B2 * | 7/2010 | Marsh et al. | 180/65.51 |
| 7,779,968 B2 * | 8/2010 | Noh | 188/2 D |
| 7,845,472 B2 * | 12/2010 | Gil et al. | 188/2 D |
| 8,511,439 B2 * | 8/2013 | Baumgartner et al. | 188/72.2 |
| 2005/0034936 A1 * | 2/2005 | Drennen et al. | 188/72.8 |
| 2005/0119085 A1 * | 6/2005 | Becker et al. | 475/162 |
| 2007/0068748 A1 * | 3/2007 | Chittka | 188/72.7 |
| 2008/0053726 A1 * | 3/2008 | Marsh et al. | 180/65.5 |
| 2008/0261743 A1 * | 10/2008 | Junkers | 475/162 |
| 2009/0032321 A1 * | 2/2009 | Marsh et al. | 180/65.51 |
| 2009/0200120 A1 * | 8/2009 | Baumgartner et al. | 188/72.2 |
| 2009/0312134 A1 * | 12/2009 | Schoon | 475/154 |
| 2010/0258372 A1 * | 10/2010 | Anderson | 180/165 |
| 2011/0100768 A1 * | 5/2011 | Baumgartner et al. | 188/72.2 |

\* cited by examiner

DECELERATOR AND MOTOR BRAKE WITH THE SAME

CROSS-REFERENCE TO RELATED APPLICATION

This application claims the benefit of Korean Patent Application No. 2011-0119911, filed on Nov. 17, 2011 in the Korean Intellectual Property Office, the disclosure of which is incorporated herein by reference.

BACKGROUND

1. Field

Embodiments of the present invention relate to a decelerator which restricts an increase in the axial thickness of a motor and achieves an effectively increased deceleration ratio, and a motor brake with the same.

2. Description of the Related Art

A greater number of brakes that employ a motor as a power source have recently been equipped in vehicles. A representative example is a disc type motor brake that employs a motor as a power source of a drive device adapted to press a frictional pad.

A disc type motor brake includes a disc to rotate along with a vehicle wheel, a pair of friction pads to press the disc, a carrier to support the pair of frictional pads, a piston to press any one of the pair of frictional pads against the disc, a caliper housing including a cylinder in which a piston is accommodated, the caliper housing being reciprocally movably supported by the carrier, a motor to generate forward/reverse rotation force, and a conversion unit to convert rotation of a motor into rectilinear reciprocation of the piston, the conversion unit generally adopting a screw-shaft coupled to the piston.

In the above-described motor brake, drive power of the motor is transmitted to the screw-shaft constituting the conversion unit, and the piston, rotation of which is limited based on a rotating direction of the screw-shaft, rectilinearly reciprocates to press one frictional pad against the disc, realizing braking.

In general, a decelerator is typically used to increase torque because of high revolutions per minute (RPM) and low torque of the motor. In the above-described motor brake, a decelerator to increase drive power of the motor is connected between the motor and the conversion unit.

To achieve an enhanced deceleration ratio, the decelerator is typically configured such that a plurality of planet gear units is stacked one above another in an axial direction of the motor to realize multi-stage deceleration.

However, in the case of the decelerator having the plurality of planet gear units stacked in the axial direction of the motor, the overall length of the brake formed in the axial direction of the motor is excessively increased, which causes deterioration in space utility of a vehicle.

SUMMARY

Therefore, it is an aspect of the present invention to provide a decelerator which restricts an increase in the axial thickness of a motor and achieves an effectively increased deceleration ratio, and a motor brake with the same.

Additional aspects of the invention will be set forth in part in the description which follows and, in part, will be obvious from the description, or may be learned by practice of the invention.

In accordance with an aspect of the present invention, a decelerator includes a first deceleration unit including a sun gear configured to rotate coaxially with an input shaft, a plurality of planet gears distributed around the sun gear so as to rotate on its axis during rotation of the sun gear, and a ring gear configured to circumscribe the plurality of planet gears so as to eccentrically rotate during rotation of the planet gears, and a second deceleration unit including an inner gear which is formed on an outer circumference thereof with cycloid teeth so as to eccentrically rotate along with the ring gear located inside an inner circumference thereof and which has a plurality of through-holes circumferentially distributed between the inner circumference and the outer circumference thereof, an outer gear which is located around the inner gear and which has teeth formed on an inner circumference thereof to correspond to the cycloid teeth, and an output member which is provided around the center of one surface thereof with a plurality of circumferentially distributed bosses having a smaller diameter than the through-holes so as to be inserted into the through-holes and which is provided at the center of the other surface thereof with an output shaft.

A bearing may be integrally fixed around the ring gear, and an outer circumference of the bearing may slip on the inner circumference of the inner gear.

The decelerator may further include a housing to surround the first and second deceleration units, and shafts of the planet gears may be fixed to the housing.

In accordance with another aspect of the present invention, a motor brake includes a disc to rotate along with a vehicle wheel, a friction pad to press the disc, a piston to press the frictional pad against the disc, a motor to generate forward/reverse rotation force, a conversion unit to convert rotation of the motor into rectilinear reciprocation of the piston, and a decelerator provided between the motor and the conversion unit for deceleration of the motor, wherein the decelerator includes a first deceleration unit including a sun gear configured to rotate coaxially with an input shaft rotating along with a shaft of the motor, a plurality of planet gears distributed around the sun gear so as to rotate on its axis during rotation of the sun gear, and a ring gear configured to circumscribe the plurality of planet gears so as to eccentrically rotate during rotation of the planet gears, and a second deceleration unit including an inner gear which is formed on an outer circumference thereof with cycloid teeth so as to eccentrically rotate along with the ring gear located inside an inner circumference thereof and which has a plurality of through-holes circumferentially distributed between the inner circumference and the outer circumference thereof, an outer gear which is located around the inner gear and which has teeth formed on an inner circumference thereof to correspond to the cycloid teeth, and an output member which is provided around the center of one surface thereof with a plurality of circumferentially distributed bosses having a smaller diameter than the through-holes so as to be inserted into the through-holes and which is provided at the center of the other surface thereof with an output shaft.

BRIEF DESCRIPTION OF THE DRAWINGS

These and/or other aspects of the invention will become apparent and more readily appreciated from the following description of the embodiments, taken in conjunction with the accompanying drawings of which.

DETAILED DESCRIPTION

Figure 1:
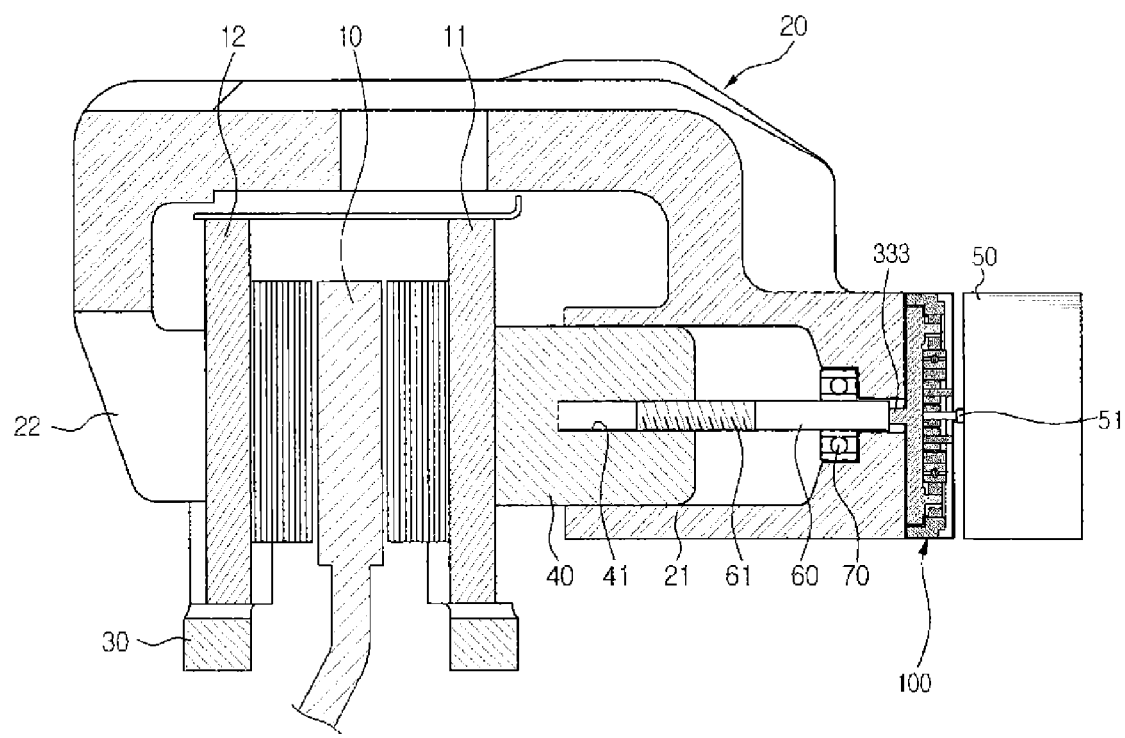
FIG. 1 is a sectional view illustrating a configuration of a motor brake according to an exemplary embodiment of the present invention.

Reference will now be made in detail to a decelerator and a motor brake with the same according to the exemplary embodiments of the present invention, examples of which are illustrated in the accompanying drawings, wherein like reference numerals refer to like elements throughout.

As illustrated in FIG. 1, the motor brake according to the present embodiment is a disc type brake device which acquires brake force by pressing a portion of a disc 10 that rotates along with a wheel (not shown) via a pair of frictional pads 11 and 12. The motor brake further includes a carrier 30 fixedly installed to a knuckle of a vehicle body and a caliper housing 20 slidably coupled to the carrier 30.

The caliper housing 20 is provided at one side thereof with a cylinder 21, and in turn a piston 40 is accommodated in the cylinder 21 to press any one frictional pad 11 against the disc 10. The caliper housing 20 is provided at the other side thereof with a downwardly bent finger 22 integrally connected to the cylinder 21. As such, the finger 22 acts to press the other frictional pad 12 against the disc 10 during sliding of the caliper housing 20. The frictional pads 11 and 12 may be classified into a first frictional pad 11 adjacent to the piston 40 and a second frictional pad 12 located at an opposite side of the first frictional pad 11.

The carrier 30 is located below the caliper housing 20 and serves to guide vertical movement of the frictional pads 11 and 12 while preventing separation of the frictional pads 11 and 12.

During braking, the piston 40 is rectilinearly reciprocally moved via driving of an electric motor 50 that is fixedly installed to the rear of the motor brake, thereby pressing the first frictional pad 11 against the disc 10. Drive power of the motor 50 is first amplified by a decelerator 100, and then is transmitted to the piston 40 through a conversion unit 60 that includes, e.g., a screw-shaft.

The conversion unit 60 in the form of the screw-shaft has the same axis as a movement direction of the frictional pads 11 and 12. One end of the conversion unit 60 is screwed to the piston 40 and the other end extends in a rearward movement direction of the piston 40 and is connected to an output shaft 333 of the decelerator 100.

The piston 40 is accommodated in the cylinder 21 to rectilinearly reciprocate with limited rotation thereof. The piston 40 includes a female screw portion 41 coupled to the conversion unit 60. To limit rotation of the piston 40, the piston 40 may have keys longitudinally formed on the outer circumference thereof, and the cylinder 21 may have keyways formed on an inner wall thereof, such that the keys of the piston 40 are slidably fitted into the keyways of the cylinder 21. Other various configurations to limit rotation of the piston 40 including, for example, corresponding polygonal structures formed on the outer circumference of the piston 40 and the inner wall of the cylinder 21, may be employed.

The conversion unit 60 in the form of the screw-shaft includes a male screw portion 61 formed at one end thereof so as to be inserted into the female screw portion 41 of the piston 40. The conversion unit 60 is rotatably accommodated in the cylinder 21 to extend in a direction parallel to the rectilinear reciprocation direction of the piston 40. The other end of the conversion unit 60 penetrates the cylinder 21 with a bearing 70 interposed therebetween. The bearing 70 ensures smooth rotation of the conversion unit 60 in the form of the screw-shaft.

The motor 50 is located outward of the cylinder 21 toward a rearward movement direction of the piston 40. The decelerator 100 is interposed between the cylinder 21 and the motor 50.

In the above-described motor brake, accordingly, drive power of the motor 50 is transmitted to the screw-shaft constituting the conversion unit 60, and the piston, rotation of which is limited based on a rotating direction of the screw-shaft, rectilinearly reciprocates to press the frictional pads 11 and 12 against the disc 10, realizing braking.

The decelerator 100 is configured not only to achieve an effectively increased deceleration ratio for an increase in the drive power of the motor 50, but also to restrict an increase in the overall length of the motor brake. This configuration of the decelerator 100 will hereinafter be described in detail.

Figure 2:
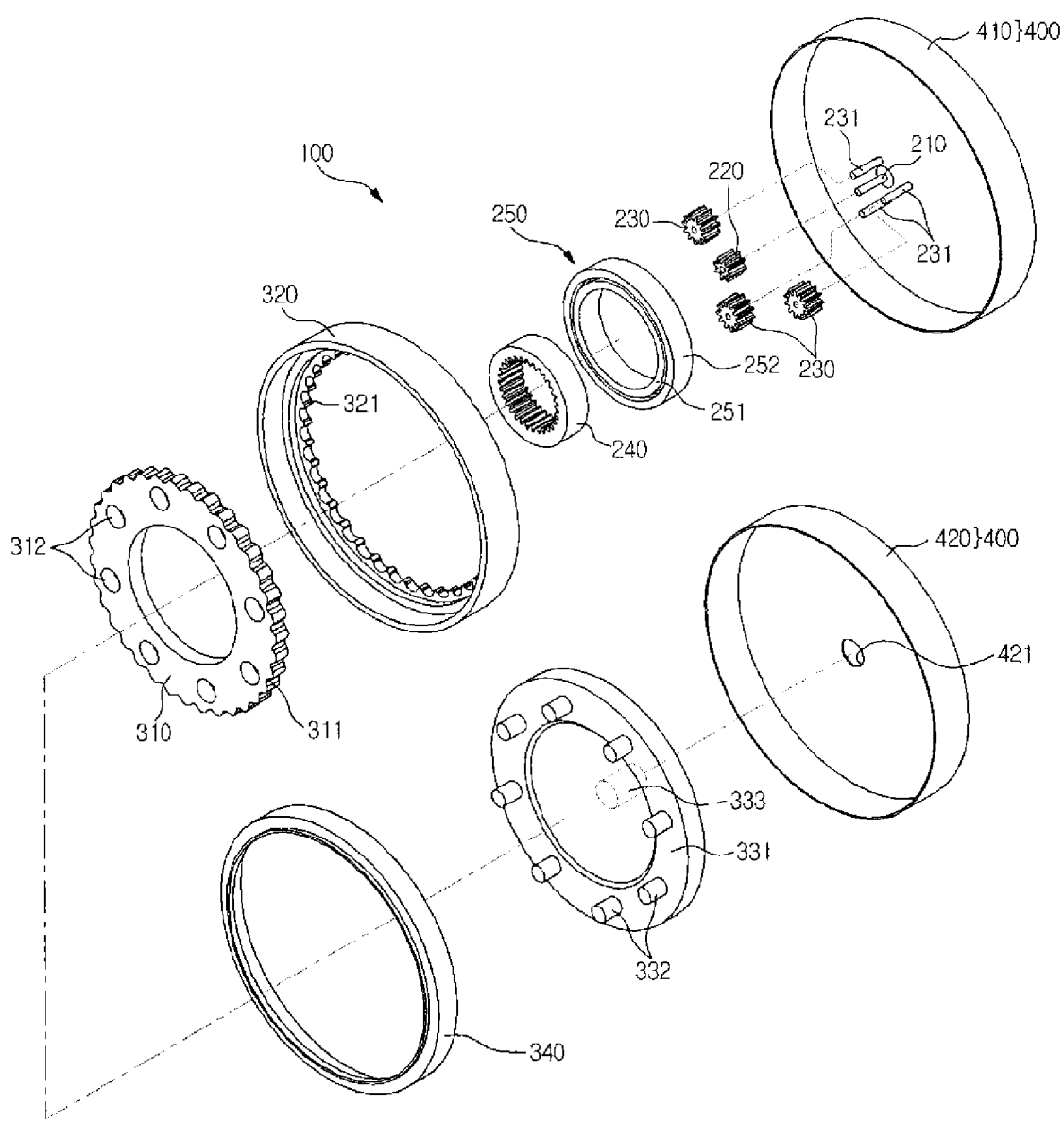
FIG. 2 is an exploded perspective view illustrating a configuration of a decelerator according to an exemplary embodiment of the present invention.
Figure 3:
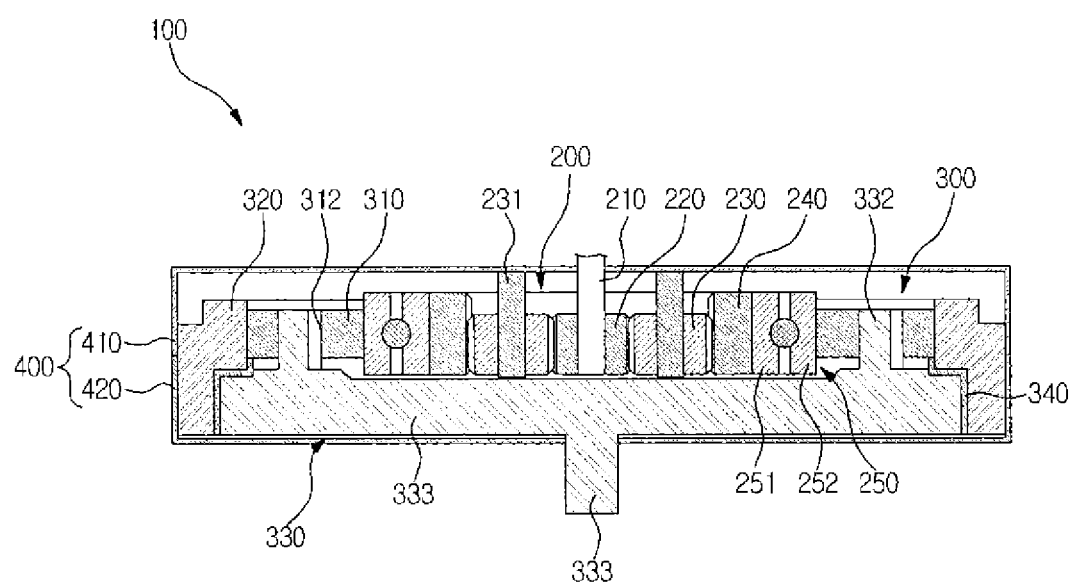
FIG. 3 is a side sectional view illustrating the configuration of the decelerator according to the exemplary embodiment of the present invention.
Figure 4:
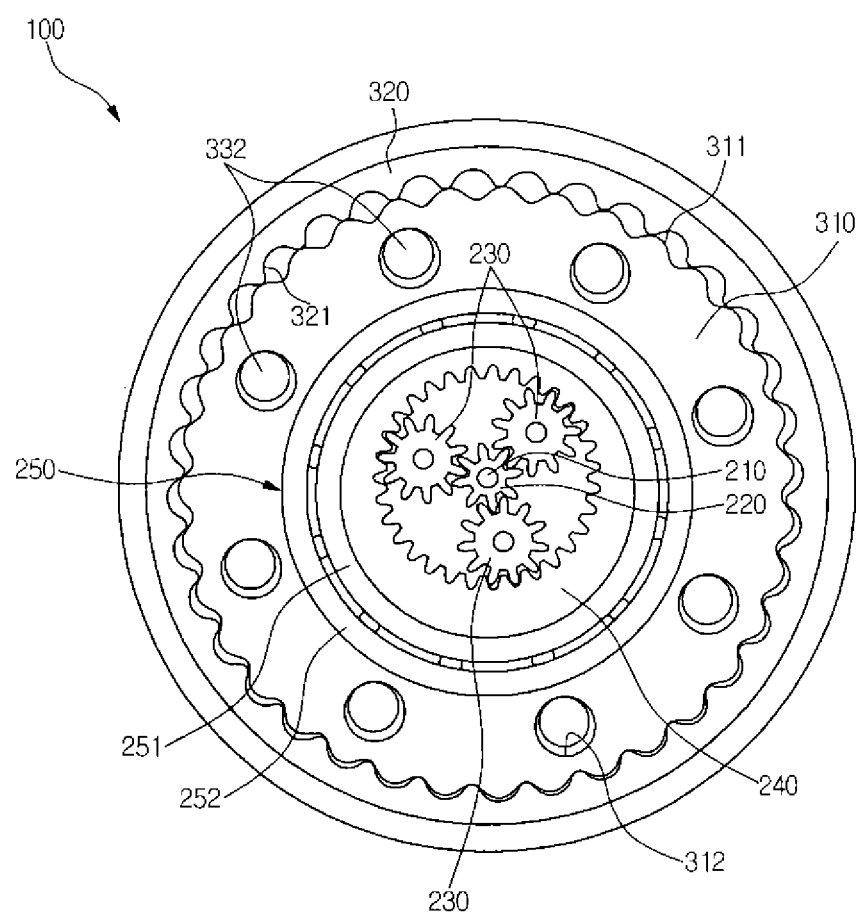
FIG. 4 is a plan view illustrating the configuration of the decelerator according to the exemplary embodiment of the present invention.

As illustrated in FIGS. 2 to 4, the decelerator 100 includes a first deceleration unit 200. The first deceleration unit 200 includes an input shaft 210 to rotate along with a shaft 51 of the motor 50, a sun gear 220 configured to rotate coaxially with the input shaft 210, a plurality of planet gears 230 distributed around the sun gear 220 so as to rotate on its axis during rotation of the sun gear 220, and a ring gear 240 configured to circumscribe the plurality of planet gears 230 so as to eccentrically rotate during rotation of the planet gears 230.

If the sun gear 230 rotates by rotation of the shaft 51 of the motor 50, the plurality of planet gears 230 around the sun gear 220 rotate on their axes, causing the ring gear 240 to rotate. In this way, a rotational speed of the motor 50 input through the input shaft 210 is primarily decelerated to a first stage while being output through the ring 240.

The decelerator 100 further includes a second deceleration unit 300. The second deceleration unit 300 includes an inner gear 310 formed on an outer circumference thereof with cycloid teeth 311, and an outer gear 320 which is located around the inner gear 310 and has teeth 321 formed on an inner circumference thereof to correspond to the cycloid teeth 311. The ring gear 240 is located inside an inner circumference of the inner gear 310, such that the inner gear 310 eccentrically rotates along with the ring gear 240. The number of the teeth 321 of the outer gear 320 may be slightly greater than the number of the teeth 311 of the inner gear 310, and the outer gear 320 may be fixed.

A bearing 250 is integrally fixed around the ring gear 240. An inner ring 251 of the bearing 250 is fixed around the ring gear 240, and an outer ring 252 of the bearing 250 slidably comes into close contact with the inner circumference of the inner gear 310.

The second deceleration unit 300 includes the output shaft 333 connected to the conversion unit 60 to rotate the conversion unit 60. The output shaft 333 is integrally formed at an output member 330 that is rotated by the inner gear 310.

More specifically, a plurality of through-holes 312 is circumferentially distributed between the inner circumference and the outer circumference of the inner gear 310. The output member 330 includes a disc-shaped body 331 oriented opposite the first deceleration unit 200. A plurality of bosses 332 is formed at one surface of the body 331 facing the first deceleration unit 220. The bosses 332 are circumferentially distributed about the center of the body 331 so as to be inserted into the respective through-holes 312. The output shaft 333 is formed at the center of the other surface of the body 331 at the opposite side of the first deceleration unit 220. Here, the bosses 332 and the output shaft 333 are integrally formed with the body 331, and the bosses 332 have a smaller diameter than the through-holes 312 to allow eccentric rotation of the inner gear 310.

Accordingly, the inner gear 310 eccentrically rotates via eccentric rotation of the ring gear 240 and the bearing 250, and simultaneously performs rotation on its axis and rotation along the inner circumference of the outer gear 320. As the output member 330, which is connected to the inner gear 310 via the bosses 332, rotates in conjunction with the rotation of the inner gear 310, the output shaft 333 rotates, which causes the rotational speed of the motor 50, which has been decelerated to the first stage by the first deceleration unit 200, to be further decelerated, and consequently results in increased drive power of the motor 50. A desired deceleration ratio value of the second deceleration unit 300 may be accomplished by adjusting the cycloid teeth 311 of the inner gear 310 and the teeth 321 of the outer gear 320. In the drawing, reference numeral '340' designates a washer that is placed around the body 331 of the output member 330 and serves to prevent interference of operation between the output member 330, the inner gear 310 and the outer gear 320.

The decelerator 100 includes a housing 400 configured to surround the first and second deceleration units 200 and 300. The housing 400 includes a first housing 410 to cover the input shaft 210 and a second housing 420 to cover the output shaft 333. The first and second housings 410 and 420 are coupled to each other to define a cylindrical housing. The input shaft 210 is rotatably installed to the first housing 410, and the second housing 420 has an aperture 421 for passage of the output shaft 333. Shafts 231 of the respective planet gears 230 of the first deceleration unit 200 are fixed to an inner surface of the first housing 410 around the input shaft 210. As such, during rotation of the sun gear 220, the planet gears 230 rotate on the centers of the respective shafts 231 fixed to the housing 400, causing the ring gear 240 to rotate. The outer gear 320 may be fixed to the inner surface of the housing 400.

With the above-described configuration, the decelerator 100 may be configured such that the first deceleration unit 200 of a planet gear type is provided inside the second deceleration unit 200 of a cycloid type so as to apply eccentric rotation force to the second deceleration unit 200.

Accordingly, the decelerator 100 according to the exemplary embodiment of the present invention may restrict an increase in the axial thickness of the motor 50 and achieve an effectively increased deceleration ratio owing to multi-stage reduction in the rotational speed of the motor 50 through use of the first deceleration unit 200 and the second deceleration unit 300.

Moreover, the motor brake that employs the decelerator 100 is restricted in the overall length due to the decelerator 100 despite an increased deceleration ratio of the motor 50 owing to the decelerator 100, thereby achieving enhanced space utility.

The present embodiment describes the case in which the decelerator 100 serves to reduce the rotational speed of the motor 50 of the motor brake. The decelerator 100, in which the first deceleration unit 200 is located inside the second deceleration unit 300, may be easily applied to a variety of motor powered devices that are intended to increase a deceleration ratio without an increase in the axial thickness of the motor, in addition to being applied to the motor brake.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A decelerator comprising:
    a first deceleration unit, wherein the first deceleration unit includes:
        a sun gear configured to rotate coaxially with an input shaft;
        a plurality of planet gears distributed around the sun gear so as to rotate on its axis during rotation of the sun gear; and
        a ring gear configured to circumscribe the plurality of planet gears so as to eccentrically rotate during rotation of the planet gears; and
    a second deceleration unit, wherein the second deceleration unit includes:
        an inner gear formed on an outer circumference thereof with cycloid teeth so as to eccentrically rotate along with the ring gear located inside an inner circumference thereof and which has a plurality of through-holes circumferentially distributed between the inner circumference and the outer circumference thereof;
        an outer gear located around the inner gear and which has teeth formed on an inner circumference thereof to correspond to the cycloid teeth; and
        an output member which is provided around the center of one surface thereof with a plurality of circumferentially distributed bosses having a smaller diameter than the through-holes so as to be inserted into the through-holes and which is provided at the center of the other surface thereof with an output shaft;
    wherein a bearing is integrally fixed around the ring gear.

2. The decelerator according to claim 1, wherein:
    an outer circumference of the bearing slips on the inner circumference of the inner gear.

3. The decelerator according to claim 1, further comprising a housing to surround the first and second deceleration units, wherein shafts of the planet gears are fixed to the housing.

4. A motor brake comprising a disc to rotate along with a vehicle wheel, a friction pad to press the disc, a piston to press the frictional pad against the disc, a motor to generate forward/reverse rotation force, a conversion unit to convert rotation of the motor into rectilinear reciprocation of the piston, and a decelerator provided between the motor and the conversion unit for deceleration of the motor,
    wherein the decelerator includes:
    a first deceleration unit, wherein the first deceleration unit includes:
        a sun gear configured to rotate coaxially with an input shaft rotating along with a shaft of the motor;
        a plurality of planet gears distributed around the sun gear so as to rotate on its axis during rotation of the sun gear; and
        a ring gear configured to circumscribe the plurality of planet gears so as to eccentrically rotate during rotation of the planet gears; and
    a second deceleration unit, wherein the second deceleration unit includes:
        an inner gear which is formed on an outer circumference thereof with cycloid teeth so as to eccentrically rotate along with the ring gear located inside an inner circumference thereof and which has a plurality of through-holes circumferentially distributed between the inner circumference and the outer circumference thereof;

an outer gear which is located around the inner gear and which has teeth formed on an inner circumference thereof to correspond to the cycloid teeth; and an output member which is provided around the center of one surface thereof with a plurality of circumferentially distributed bosses having a smaller diameter than the through-holes so as to be inserted into the through-holes and which is provided at the center of the other surface thereof with an output shaft; wherein a bearing is integrally fixed around the ring gear.

5. The motor brake according to claim 4, wherein:

an outer circumference of the bearing slips on the inner circumference of the inner gear.

\* \* \* \* \*